United States Patent [19]
Durst et al.

[11] Patent Number: 5,574,275
[45] Date of Patent: Nov. 12, 1996

[54] ADJUSTABLE RESOLUTION OPTICAL SENSOR

[75] Inventors: David I. Durst, Syosset, N.Y.; Patrick L. Hayman, Mission Viega, Calif.; Martin Klop, Great River, N.Y.

[73] Assignee: Northrop Grumman Corporation, Los Angeles, Calif.

[21] Appl. No.: 409,361

[22] Filed: Mar. 23, 1995

[51] Int. Cl.$^6$ .............................. G01C 21/02; G01J 1/42
[52] U.S. Cl. ................................. 250/208.2; 250/203.1; 250/203.6; 250/332
[58] Field of Search ........................... 250/208.1, 214.1, 250/214 R, 214 A, 332, 334, 330, 208.2, 208.6, 203.1, 203.2, 203.3, 203.4, 203.6, 206.1, 206.2; 244/316

[56] References Cited

U.S. PATENT DOCUMENTS

| | | | |
|---|---|---|---|
| 4,675,532 | 6/1987 | Carson | 250/578 |
| 4,814,629 | 3/1989 | Arnold | 250/578 |
| 5,293,036 | 3/1994 | Norton | 250/332 |
| 5,304,790 | 4/1994 | Arnold | 250/208.1 |

*Primary Examiner*—Edward P. Westin
*Assistant Examiner*—JohnR.Lee
*Attorney, Agent, or Firm*— Terry J. Anderson; Karl J. Hoch, Jr.

[57] ABSTRACT

An optical sensor and a method of operating an optical sensor. The optical sensor includes a plurality of unit cells, a plurality of groups of optical detectors, an amplifier and a plurality of selection circuits. Each of the unit cells includes at least first and second pixels, and each group of optical detectors is associated with a respective one of the unit cells. Each group of detectors includes at least first and second detectors to generate first and second electric signals representing the intensity of light incident on, respectively, the first and second pixels of the associated unit cell. Each of the selection circuits is associated with a respective one of the groups of detectors for transmitting to the amplifier the electric signals from the associated group of detectors. Also, each selection circuit has first and second modes for conducting to the amplifier, respectively, either the electric signal from only the first detector of the associated group of detectors, or the electric signals from both the first and second detectors of that associated group of detectors. By switching the selection circuit between the first and second modes, the sensor may operate at either a course resolution or a fine resolution. Thus, by combining electronic switching and summing of detector elements, a single array of detectors can function in both course and fine resolution modes.

12 Claims, 3 Drawing Sheets

ADJUSTABLE RESOLUTION OPTICAL SENSOR

BACKGROUND OF THE INVENTION

This invention generally relates to optical sensors; and more specifically to staring optical sensors having adjustable resolutions.

A staring optical sensor is usually a two-dimensional focal plane mosaic of photodetectors each of which generates an electric current representing the intensity of light incident on a given area of observation, referred to as a pixel, and representing one unit of resolution. Typically, the area behind each photodetector is used for electronic circuitry to amplify and multiplex the detector signal.

The spatial resolution of a staring optical sensor is typically determined by the size and spacing of the detectors on the focal plane of the sensor, in conjunction with the focal length of the sensor optical system. In many circumstances, it is desirable to provide the sensor with the ability to operate at both fine and coarse resolutions. The sensor may be used to observe a wide field of view at a coarse spatial resolution to detect a target of interest, and then, once the target is detected, the sensor may be operated to track the target using a narrower field of view with finer spatial resolution. For instance, many space borne applications involve observing the entire earth with a wide field of view for a target, and then tracking the target with a narrower field of view and a finer resolution.

In many situations, including typical space borne applications, all of the sensor components that affect spatial resolutions are fixed and cannot be changed after launch. The requirement, to simultaneously observe a wide field (coarse resolution) and a narrow field (fine resolution), is normally satisfied either by providing either a single wide field sensor with fine resolution globally, or by providing two sensors, one with global coverage and coarse resolution, and a second, pointable sensor with a narrow field of view and fine resolution. Optical zoom techniques usually can not simultaneously offer wide and narrow field performance and present reliability and costs concerns.

Both of the above-mentioned approaches have disadvantages. On the one hand, the traditional single sensor approach, while offering some design and cost advantages, nevertheless requires a relatively large number of inefficiently utilized detector channels, thus requiring a wide bandwidth data link to handle the resulting large quantity of data. The data processor needed to handle this data must also be oversized. On the other hand, the dual sensor approach is burdened by the added weight and costs of a pointing mechanism and of two separate focal planes, optical systems and signal processors.

SUMMARY OF THE INVENTION

An object of this invention is to improve optical sensors.

Another object of the present invention is to provide a single optical sensor capable of a wide field of view coverage with coarse resolution coupled with the ability to command local areas of a focal plane to operate with finer spatial resolution.

A further object of this invention is to construct an optical sensor from a multitude of unit cells, each of which can be operated with either a fine or a coarse resolution.

Another object of this invention is to separate an optical sensor into a multitude of unit cells, to generate two different optical signals from each cell representing two different areas of the cell, and to process selectively either one or both of those optical signals to operate the sensor with, respectively, either a fine or coarse resolution.

An object of the present invention is to operate a single array of optical detectors in both coarse and fine resolution modes by combining electronic switching and summing of the detector elements with multiple mirror toggle displacements.

These and other objectives are attained with an optical sensor and a method of operating an optical sensor. The optical sensor includes a plurality of unit cells, a plurality of groups of optical detectors, and amplifier and a plurality of selection circuits. Each of the unit cells includes at least first and second pixels, and each group of optical detectors is associated with a respective one of the unit cells and includes at least first and second detectors. The first and second detectors of each group of detectors generates first and second electric signals representing the intensity of light incident on, respectively, the first and second pixels of the associated unit cell. Each of the selection circuits is associated with a respective one of the groups of optical detectors for transmitting to the amplifier the electric signals from the associated group of optical detectors. Also, each selection circuit has first and second modes for conducting to the amplifier, respectively, either the electric signal from only the first optical detector of the associated group of optical detectors, or the electric signals from both the first and second optical detectors of that associated group of detectors.

Preferably, each of the selection circuits includes an output line, first and second input lines and a switch. The output line is connected to the amplifier. The first input line is electrically connected in series between the output line and the first detector of the associated group of detectors, and the second input line is electrically connected in series between the output line and the second detector of the associated group of detectors. In this way, the first and second input lines transmit electric signals to the output line from, respectively, the first and second detectors. The switch is located in the second input line to control the transmission of electric signals therethrough, and the switch includes first and second states, respectively, to transmit, or to prevent the transmission of, the electric signal to the amplifier from the second detector of the associated group of detectors.

The optical sensor may operate at either a coarse resolution or a fine resolution. To operate the sensor at a coarse resolution, the switches of the sensor are operated in their second states so that the output of each amplifier of the sensor represents the light signal incident on the entirety of the associated unit cell. To operate the sensor at a fine resolution, the switches of the sensor are operated in their first states so that the output of each amplifier of the sensor represents the light signal incident on only the first pixel of the associated unit cell. Thus, by combining electronic switching and summing of detector elements, a single array of detectors can function in both course and fine resolution modes.

Further benefits and advantages of the invention will become apparent from a consideration of the following detailed description given with reference to the accompanying drawings, which specify and show preferred embodiments of the invention.

DETAILED DESCRIPTION OF THE PREFERRED EMBODIMENTS

Figure 1:
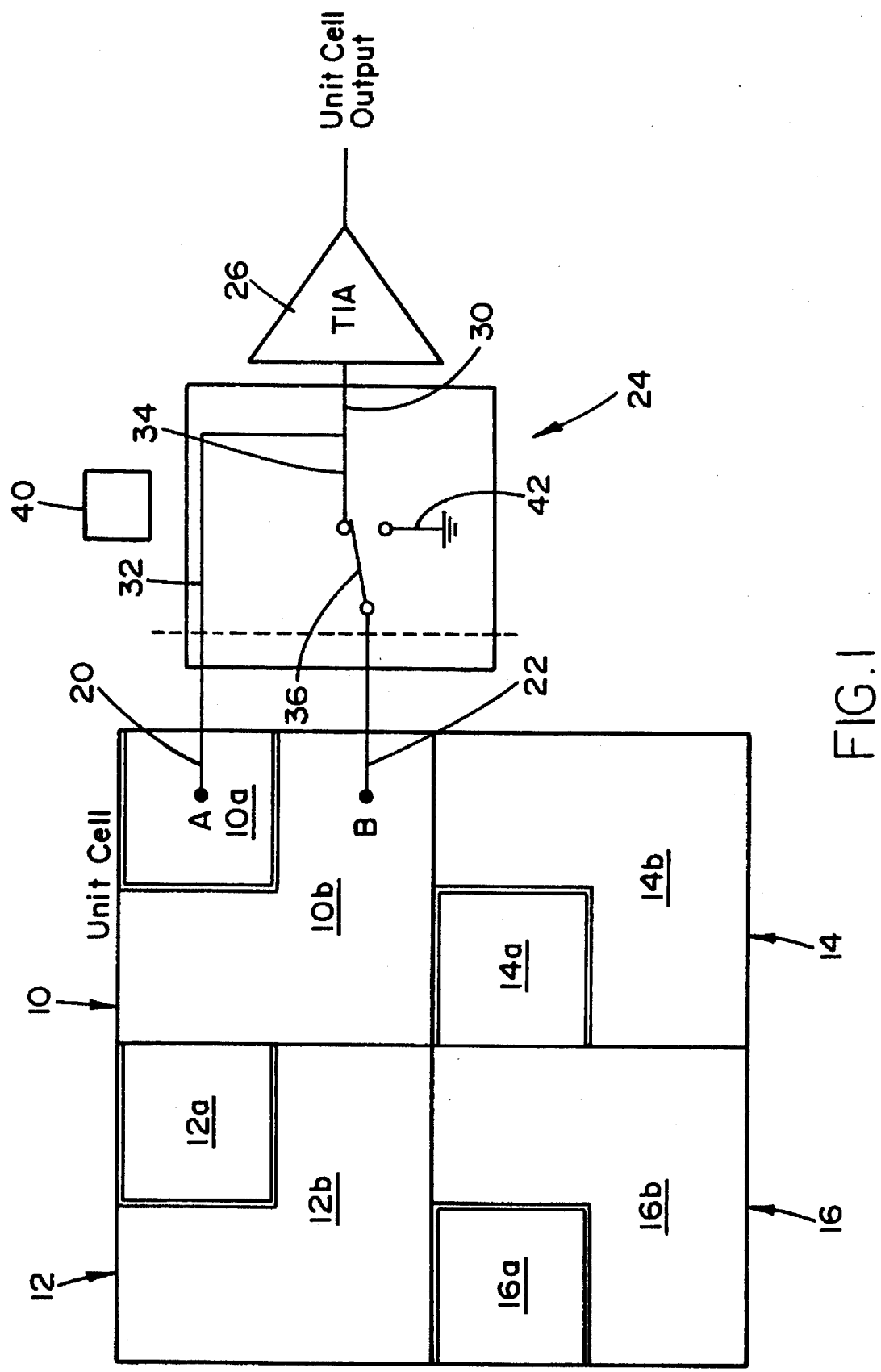
FIG. 1 diagrammatically illustrates a group of cells of an optical sensor embodying the present invention.

FIG. 1 illustrates a group of cells of an optical sensor, and the detectors and electronic circuitry associated with one of those cells. In particular, FIG. 1 shows cells 10, 12, 14, and 16, detectors, 20 and 22 circuit 24 and amplifier 26. The embodiment of circuit 24 illustrated in FIG. 1 includes output line 30, first and second input lines, 32 and 34, switch 36, control means 40 and ground connection 42. As shown in FIG. 1, detectors 20 and 22, circuit 24 and amplifier 26 are associated with cell 10. Similar detectors and electronic circuitry are associated with each of the other cells 12, 14 and 16; however, for the sake of simplicity, these additional detectors and electronic circuitry are not shown in FIG. 1.

Cell 10 includes at least first and second pixels 10a and 10b, and each of detectors 20 and 22 is associated with a respective one of the pixels 10a and 10b for generating an electric signal representing the intensity of light incident on that one pixel. Circuit 24 is connect to detectors 20 and 22 and to amplifier 26 to conduct electric signals from those detectors to the amplifier; and circuit 24 has first and second modes for conducting to amplifier 26 either only the signal from detector 20, or both signals from detector 20 and detector 22. More specifically, in the first mode, circuit 24 conducts the electric signal from only first detector 20 to amplifier 26; and in the second mode, circuit 24 conducts the electric signals from both detectors 20 and 22 to amplifier 26. Amplifier 26 receives the electric signals from circuit 24 and amplifies the received signals.

In operation, an image, or a portion of an image, is incident on each of the cells 10, 12, 14 and 16. Each of the detectors 20 and 22 associated with each of the cells generates an electric signal representing the intensity of light incident of the cell pixel associated with the detector. For instance, detector 20 generates a signal representing the intensity of light incident on pixel 10a of cell 10; and corresponding detectors generate signals representing the intensity of light incident on each of the pixels 12a, 14a, and 16a of cells 12, 14, 16. Likewise, detector 22 generates a signal representing the intensity of light incident on pixel 10b of cell 10; and corresponding detectors generate signals representing the intensity of light incident on each of the pixels 12b, 14b, and 16b of cells 12, 14, and 16.

To operate a particular unit cell at a fine resolution, the circuit 24 associated with that unit cell is operated in its first mode, so that only the signal from one of the pixels of the unit cell is conducted to the associated amplifier 26. To operate a particular unit cell at a course resolution, the circuit 24 associated with that unit cell is operated in its second mode, so that the signals from both pixels of the unit cell are conducted to the associated amplifier 26.

The detectors associated with cells 10, 12, 14 and 16 are located in a common plane, referred to as an image or focal plane. In addition, as depicted in FIG. 1, each of the unit cells 10, 12, 14 and 16 has a square shape and forms two pixels. The first pixel of each unit cell has a square shape, approximately one-quarter the size of the unit cell; and the second pixel of each unit cell is substantially the remainder of the unit cell—that is the area of the unit cell outside the first pixel of the cell. Pixels 10a and 12a are located in the upper right hand corner of their respective unit cells, and pixels 14a and 16a are located in the upper left hand corner of their respective unit cells.

As will be understood by those of ordinary skill in the art, it is not necessary that unit the cells have square shapes. In addition, each unit cell may form more than two pixels; and the pixels of the unit cell may have shapes and sizes other than as shown in FIG. 1. For example, each unit cell may have four pixels, each of which is a square, arranged in a two-by-two array. As another example, each unit cell may form two, three or more rectangular shaped pixels. Also, in practice, the optical detectors associated with each unit cell are located closely adjacent to each other, and the area of each detector forms and defines one of the pixels of the unit cell.

As previously mentioned, circuit 24 conducts electric signals from detectors 20 and 22 to amplifier 26; and this circuit is operated so that, in a first mode, only the electric signal from detector 20 is transmitted to amplifier 26, while in a second mode, the electric signals from both detectors 20 and 22 are transmitted to amplifier 26. Preferably, in this second mode, the electric signals from detectors 20 and 22 are summed, at summing junction 44 and this summed signal is applied to amplifier 26.

More specifically, each of the input lines 32 and 34 of circuit 24 is electrically connected in series between output line 30, and a respective one of the optical detectors 20 and 22 for conducting an electric signal from that one detector to amplifier 26. As shown in FIG. 1, input line 32 is connected to detector 20, and input line 34 is connected to detector 22. Switch 36 is located in input line 34 for controlling the transmission of electric signals therethrough, and this switch has first and second states. In the first state, switch 36 prevents the electric signal from detector 22 from being transmitted through the switch and to amplifier 26; and in the second state, switch 36 conducts the electric signal from detector 22 to amplifier 26.

Thus, depending on whether switch 36 in the first state or the second state, the amplifier output represents the light falling on either a small, high resolution detector 20, or the equivalent of a large coarse resolution detector—that is, the combination of detectors 20 and 22. In addition, preferably, when switch 36 is in the second state, the switch electrically connects input line 34 to ground connection 42 and, as a result, brings the electric voltage level of optical detector 22 to a ground level.

FIG. 1 schematically represents switch 36 as a mechanical switch, moveable between two positions in which the switch 36 is connected to contacts.

Preferably, however, switch 36 is an electronic switch and the switch is changed between the above-mentioned first and second states by the application of gate currents. With this preferred embodiment of circuit 24, control means 40 is provided to control the state of switch 36, and in particular, to apply the requisite gate currents to the switch to change the switch between its first and second states in the desired manner. This control means 40, for example, may apply first and second current or voltage levels to switch 36 to cause the switch to assume its first or second states respectively.

Figure 2:
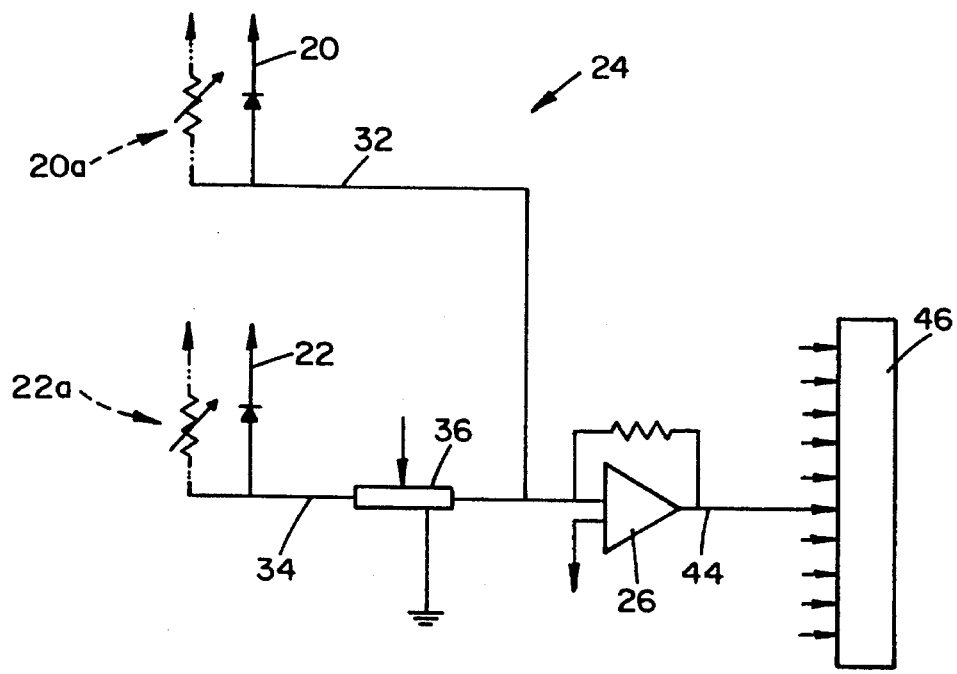
FIG. 2 is a schematic diagram of a preferred focal plane circuitry associated with each cell.

FIG. 2 shows in greater detail the focal plane circuitry associated with each unit cell. Detectors 20 and 22 are connected to input lines 32 and 34, respectively, and switch 36 is located in line 34. When switch is in the second state, current from both photodetectors 20 and 24 are conducted to summing junction 44, at which these two currents are summed, and this summed current is thence conducted to preamplifier 26. Preamplifier 26 amplifies the current conducted to it and feeds its output to multiplexer 46. Multiplexer 46 has parallel input branches from other cell units, and a control circuit to control or identify the output signals conducted off the multiplexer.

The circuit of FIG. 2 is designed for the use of photovoltaic detectors. If photo-conductive detectors are used, exterior current source 20a and 22a (shown in phantom) are included. One or more filters (not shown) may be included in circuit 24, either to process the electric signals conducted through the circuit or to select particular frequencies or frequency bands for transmission through the circuit. Also, photodetectors 20 and 22, switch 36, amplifier 26 and multiplexer may be standard, conventional elements.

Figure 3:
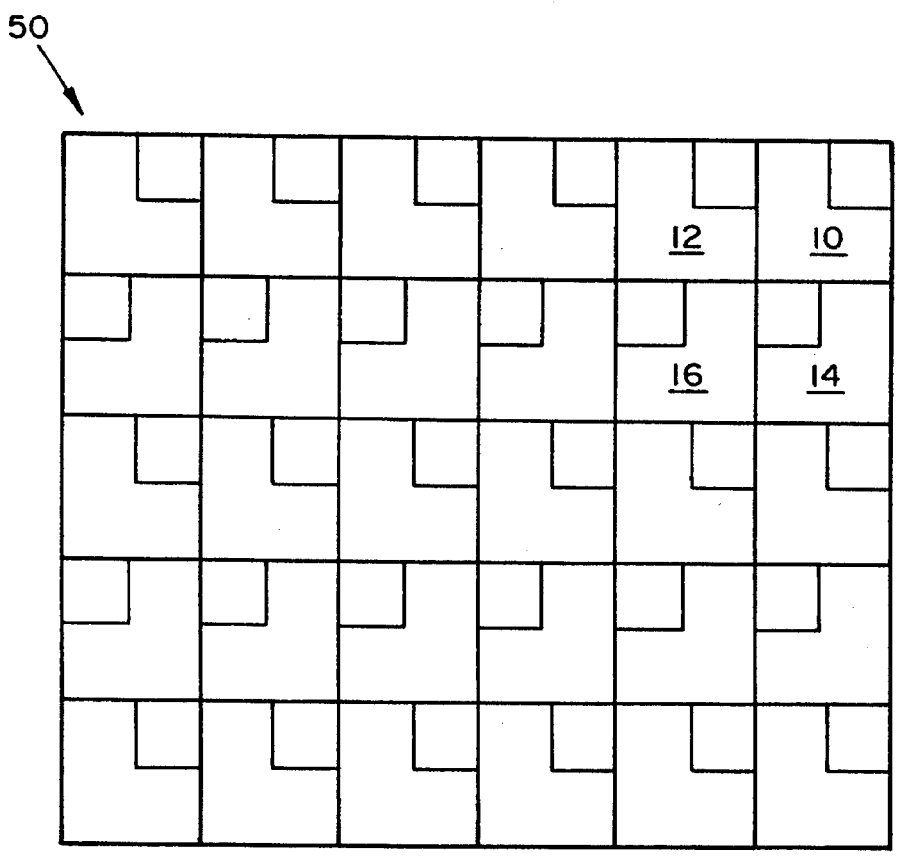
FIG. 3 diagrammatically illustrates an optical sensor constructed of a multitude of cells of the type shown in FIG. 1.

Preferably, cells 10, 12, 14 and 16 are part of a larger two-dimensional array of similar or identical cells that form an optical sensor, schematically illustrated at 50 in FIG. 3. Each cell of sensor 50 is provided with a pair of detectors analogous to detectors 20 and 22 of FIG. 1, and with an electronic circuitry analogous to circuit 24 and amplifiers 26 of FIG. 1. Sensor 50 may operate at either a coarse resolution of a fine resolution. To operate sensor 50 at a coarse resolution, the switches 36 of the sensor are operated in their second states so that the output of each amplifier represents the light signal incident on the entirety of the associated unit cell. To operate sensor 50 at a fine resolution, the switches 36 of the are operated in their first states so that the output of each amplifier 26 of the sensor represents the light signal incident on only the first pixel of the associated unit cell.

When set for the coarse resolution mode, the detector array 50 provides one hundred percent coverage of the image falling on it without any blank regions. In the fine resolution mode, however, the array output represents the light signal falling on the small detectors only. In addition, preferably, the large inactive detector is grounded and acts as a guard ring to define electrically the optically active detector.

Preferable, when sensor 50 operates in the fine resolution mode, the image is moved relative to the sensor, or alternatively the sensor is moved relative to the image, so that each portion of each unit cell is stepped across one of the first detectors of array 50. Any suitable means and any suitable procedure may be used to move the image relative to sensor 50 to achieve this result.

Figure 4:
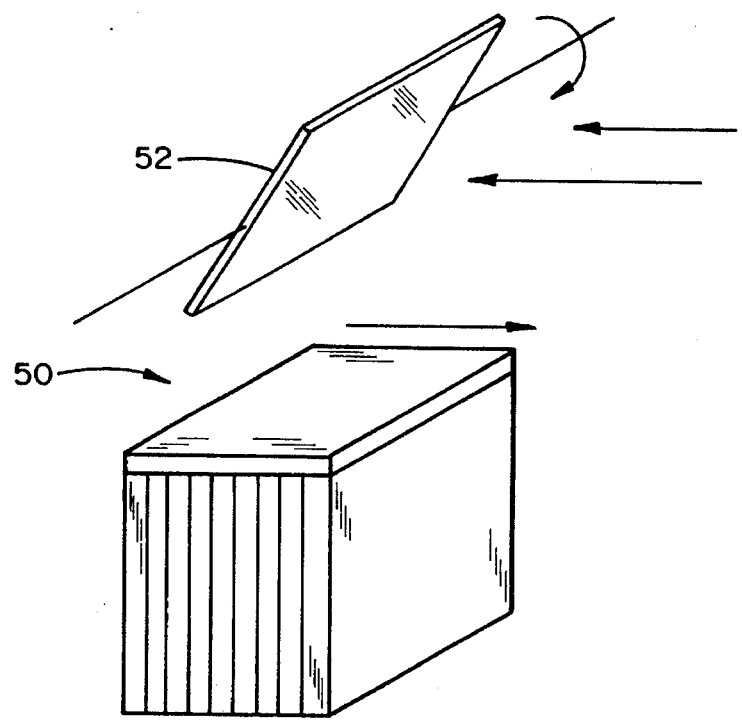
FIG. 4 shows a stepping system that may be used with the sensor of FIG. 3.
Figure 5:
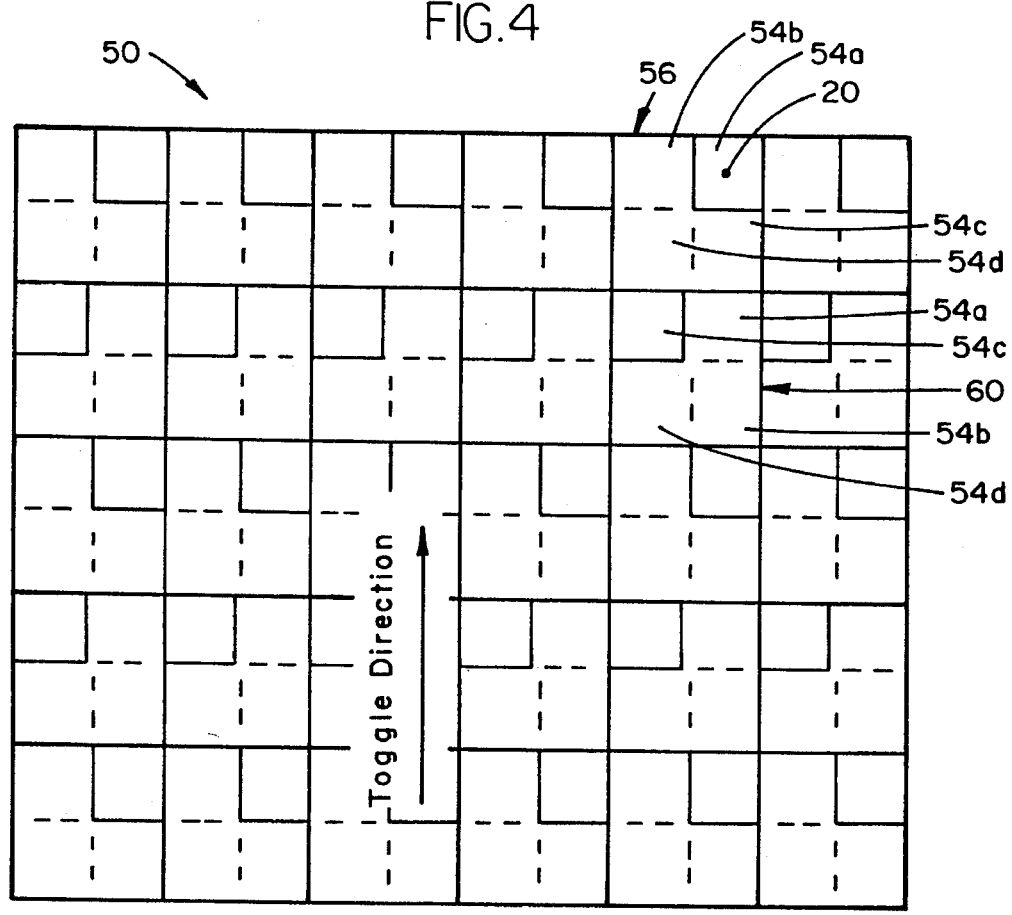
FIG. 5 illustrates one procedure for stepping pixels or virtual pixels of the sensor across a photodetector.

For example, with reference to FIGS. 4 and 5, mirror 52 may be used to step or toggle the image on sensor 50. More specifically, each unit cell of sensor 50 may be divided into a plurality of sections, referred to as pixels or virtual pixels; and mirror 52 may be used to step a plurality of cell sections, one at a time, over the first detector 20 of one of the unit cells. In this way, mirror 52 is toggled in a pattern to create an array of virtual detectors surrounding each physical detector.

With particular reference to FIG. 5, each unit cell may be divided into four sections, identified as 54a, 54b, 54c and 54d. Section 54a is the same as pixel 12a of the unit cell; and sections 54b, 54c and 54d are formed by separating pixel 12b of the unit cell into three equal-size square areas. Mirror 52 may be used to step four cell sections vertically over each detector 20; and, for instance, sections 54a and 54b of the cell referenced at 56, and then sections 54a and 54b of the cell referenced at 60 may be stepped over detector 20 of cell 56. Thus, by combining electronic switching and summing of detector elements with multiple mirror toggle displacements, a single array of detectors can function in both coarse and fine resolution modes.

While it is apparent that the invention herein disclosed is well calculated to fulfill the objects previously stated, it will be appreciated that numerous modifications and embodiments may be devised by those skilled in the art, and it is intended that the appended claims cover all such modifications and embodiments as fall within the true spirit and scope of the present invention.

We claim:

1. An optical sensor comprising:

a plurality of unit cells, each of the unit cells including at least first and second pixels;

a plurality of groups of optical detectors, each group of optical detectors being associated with a respective one of the unit cells and including (i) a first detector for generating a first electric signal representing the intensity of light incident on the first pixel of the associated unit cell, and (ii) a second detector for generating a second electric signal representing the intensity of light incident on the second pixel of the associated unit cell;

an amplifier; and a plurality of selection circuits, each of the selection circuits being associated with a respective one of the groups of optical detectors for transmitting to the amplifier the electric signals from the associated group of optical detectors, and each selection circuit having first and second modes, in the first mode, each selection circuit conducts to the amplifier the electric signal from only the first optical detector of the associated group of optical detectors, and in the second mode, each selection circuit sums the electric signals from the first and second optical detectors of the associate group of optical detectors and conducts the summed electric signal to the amplifier; and wherein the amplifier amplifies the electric signals conducted thereto.

2. An optical sensor according to claim 1, wherein each of the selection circuits includes:

an output line;

a first input line electrically connected in series between the output line and the first detector of the associated group of detectors for transmitting electric signals to the output line from the first detector of the associated group of detectors;

a second input line electrically connected in series between the output line and the second detector of the associated group of detectors for transmitting electric signals to the output line from the second detector of the associated group of detectors;

a switch located in the second input line to control the transmission of electrical signals therethrough, and including (i) a first state to transmit to the output line the electric signals from the second detector of the associated group of detectors, and (ii) a second state to prevent the transmission of the electric signals to the output line from the second detector of the associated group of detectors.

3. An optical sensor according to claim 2, further including control means to control the states of the switches.

4. An optical sensor according to claim 1, wherein the first and second pixels of each of the unit cells are adjacent to each other.

5. An optical sensor according to claim 1, further including stepping means to step the second pixel of each unit cell over the first detector of the associated group of optical detectors to enable the first detector of the associated group of optical detectors to generate an electric signal representing the intensity of light incident on the second pixel of said each unit cell.

6. A method of operating an optical sensor including a multitude of unit cells, each of the unit cells having at least first and second pixels and first and second optical detectors for generating electric signals representing the intensity of light incident on the first and second pixels, respectively, the method comprising the steps of:

conducting the electric signals from the first and second detectors to a selection circuit, the selection circuit having first and second modes;

when the selection circuit is in the first mode, conducting the electric signal from only the first detector though the selection circuit and to an amplifier;

when the selection circuit is in the second mode, conducting the electric signals from both the first and second detectors through the selection circuit and to the amplifier; and amplifying the electric signals conducted to the amplifier.

7. A method according to claim 6, wherein:

the selection circuit includes an output line, first and second input lines, and a switch located in the second input line;

the first input line is electrically connected in series between the first detector and the output line for conducting electric signals from the first detector to the output line;

the second input line is electrically connected in series between the second detector and the output line for conducting electric signals from the second detector to the output line;

the switch has a first state for preventing electric signals from passing through the second input line to the output line, and a second state for conducting electric signals through the second input line to the output line;

the step of conducting the electric signal from only the first detector to the amplifier includes the step of maintaining the switch in first state when the selection circuit is in the first mode; and the step of conducting the electric signals from both the first and second detectors to the amplifier includes the step of maintaining the switch in the second state when the selection circuit is in the second mode.

8. A method according to claim 6, wherein the step of conducting the electric signals from only the first detector includes the steps of when the selection circuit is in the first mode, stepping the second pixel over the first detector, (ii) the first detector, also generating an electric signal representing the intensity of light incident on the second pixel, and (iii) transmitting the electric signal representing the intensity of light incident on the second pixel, through the selection circuit and to the amplifier.

9. A cell for use in an optical sensor, the cell comprising:

at least first and second pixels;

a first optical detector for generating a first electric signal representing the intensity of light incident on the first pixel;

a second optical detector for generating a second electric signal representing the intensity of light incident on the second pixel;

an amplifier; and a selection circuit connected in series between the amplifier and the first and second optical detector for transmitting the first and second electric signals from the first and second detectors to the amplifier;

wherein the selection circuit has first and second modes, in the first mode, the selection circuit conducts the electric signal from only the first optical detector to the amplifier, in the second mode, the selection circuit sums the electric signals from the first and second optical detectors and conducts the summed electric signals to the amplifier; and wherein the amplifier amplifies the electric signals conducted hereto.

10. A cell according to claim 9, wherein:

the selection circuit includes first and second input lines and a switch;

the first input line is electrically connected in series between the first optical detector and the amplifier;

the second input line is electrically connected in series between the second optical detector and the amplifier;

the switch is located in the second input line and has first and second states;

in the first state, the switch transmits the signal from the second optical detector, through the second input line and to the amplifier; and in the second state, the switch prevents the transmission of the signal from the second optical detector to the amplifier.

11. A cell according to claim 10, wherein the selection circuit further includes control means to change the switch between the first and second states.

12. A cell according to claim 10, wherein when the switch is in the second state, the switch electrically connects the second optical detector to a ground voltage level to maintain the second optical detector at said ground voltage level.

* * * * *